United States Patent
Highnote

(10) Patent No.: US 12,075,945 B1
(45) Date of Patent: Sep. 3, 2024

(54) HIGH SPEED CONVECTION FRYER

(71) Applicant: Sidney Tracy Highnote, Tetonia, ID (US)

(72) Inventor: Sidney Tracy Highnote, Tetonia, ID (US)

(*) Notice: Subject to any disclaimer, the term of this patent is extended or adjusted under 35 U.S.C. 154(b) by 0 days.

(21) Appl. No.: 17/803,438

(22) Filed: Dec. 7, 2022

(51) Int. Cl.
*A47J 37/12* (2006.01)

(52) U.S. Cl.
CPC ....... *A47J 37/1223* (2013.01); *A47J 37/1233* (2013.01); *A47J 37/1285* (2013.01); *A47J 37/129* (2013.01)

(58) Field of Classification Search
CPC .............. A47J 37/1223; A47J 37/1266; A47J 37/1219; A47J 37/1233; A47J 37/1242; A47J 37/1209; A47J 27/0817; A47J 37/12; A47J 37/1247; A47J 37/1252; A47J 37/128; A47J 37/1285; A47J 37/129; A47J 2027/006; A47J 2027/043; A47J 27/04; A47J 27/14; A47J 27/16; A47J 27/18; A47J 36/10; A47J 36/32; A47J 37/1214; A47J 37/1238; A47J 37/1257; A47J 37/1261; A47J 37/1295
USPC ......... 99/408, 330, 403, 331, 407, 332, 342, 99/409, 337, 410, 413, 418, 326, 329 R, 99/333, 336, 340, 344, 350, 355, 356, 99/404, 406, 419, 427, 443 C, 444, 450
See application file for complete search history.

(56) References Cited

U.S. PATENT DOCUMENTS

| | | | | |
|---|---|---|---|---|
| 3,210,193 A | * | 10/1965 | Martin | A23L 5/11 99/330 |
| 3,410,199 A | * | 11/1968 | Quednau | A47J 37/1233 99/330 |
| 3,638,558 A | * | 2/1972 | Bennett | A47J 37/1233 99/408 |
| 3,688,683 A | * | 9/1972 | Boggs | A47J 37/1233 392/471 |
| 3,701,313 A | * | 10/1972 | Boggs | A47J 37/1233 210/DIG. 8 |
| 3,750,560 A | * | 8/1973 | Holmes | A47J 37/1223 210/DIG. 8 |
| 3,839,951 A | * | 10/1974 | Palmason | A47J 37/1233 99/411 |
| 3,850,560 A | * | 11/1974 | Farrell | B29C 49/063 425/DIG. 231 |
| 3,977,973 A | * | 8/1976 | Anderson | B01D 37/02 210/DIG. 8 |
| 4,047,476 A | * | 9/1977 | Liebermann | A23L 5/12 99/330 |
| 4,084,492 A | * | 4/1978 | Sullivan | A47J 37/1233 99/330 |
| 4,324,173 A | * | 4/1982 | Moore | A47J 37/1223 219/509 |

(Continued)

*Primary Examiner* — Chris Q Liu

(57) ABSTRACT

A convection fryer is composed of a main oil circulating pump, a tube heat exchanger, a fry tank, a continuous oil filtration system, an oil storage holding tank filter frame and filter bag, and a main circulating pump. Cooking oil is pumped by the main circulating pump to the heat exchanger to the fry tank. Oil flows from the tank through the filter screen to the pump trough to the main circulating pump completing the oil circulating loop. At the end of the cooking day the oil is drained to the holding tank for storage while the fry tank is cleaned. In the next fry cycle the oil is pumped up out of the holding tank to the fry tank to start the cooking process all over again.

1 Claim, 15 Drawing Sheets

(56) References Cited

U.S. PATENT DOCUMENTS

| | | | | |
|---|---|---|---|---|
| 4,503,320 | A * | 3/1985 | Polster | G05D 23/1931 99/330 |
| 4,623,544 | A * | 11/1986 | Highnote | A47J 37/1233 426/523 |
| 4,688,475 | A * | 8/1987 | Witt | A47J 37/1266 99/325 |
| 4,882,984 | A * | 11/1989 | Eves | A47J 37/1214 99/406 |
| 4,890,548 | A * | 1/1990 | Grob | A47J 37/1223 99/330 |
| 4,913,038 | A * | 4/1990 | Burkett | G05D 23/1913 99/332 |
| 4,974,501 | A * | 12/1990 | Grob | A47J 37/1223 210/DIG. 8 |
| 5,261,322 | A * | 11/1993 | Yokoyama | F23C 15/00 210/DIG. 8 |
| 5,297,474 | A * | 3/1994 | Tabuchi | A47J 37/1223 210/DIG. 8 |
| 5,609,093 | A * | 3/1997 | Hohler | A23L 7/109 99/330 |
| 5,643,626 | A * | 7/1997 | Henson | A23L 5/11 99/330 |
| 5,680,811 | A * | 10/1997 | Highnote | A47J 37/1233 210/DIG. 8 |
| 5,776,530 | A * | 7/1998 | Davis | A47J 37/1223 99/330 |
| 5,832,810 | A * | 11/1998 | Brawley, Sr. | A47J 37/1271 99/403 |
| 5,973,297 | A * | 10/1999 | Winter | A47J 37/1266 219/439 |
| 6,095,037 | A * | 8/2000 | Savage | A47J 37/1247 210/DIG. 8 |
| 6,131,564 | A * | 10/2000 | Song | A47J 37/1271 126/391.1 |
| 6,182,561 | B1 * | 2/2001 | Garner | A47J 37/129 99/403 |
| 6,235,210 | B1 * | 5/2001 | Saksena | A47J 37/1238 210/791 |
| 6,378,420 | B1 * | 4/2002 | Savage | A47J 37/1223 210/DIG. 8 |
| 6,455,085 | B1 * | 9/2002 | Duta | A23L 5/11 426/523 |
| 6,572,764 | B2 * | 6/2003 | Mullaney, Jr. | A47J 37/1223 210/DIG. 8 |
| 6,689,408 | B2 * | 2/2004 | Nockermann | A23L 5/11 426/438 |
| 6,883,419 | B2 * | 4/2005 | Suzuki | A47J 37/1252 99/332 |
| 6,935,223 | B2 * | 8/2005 | Kobayashi | A47J 27/0817 210/DIG. 8 |
| 7,100,497 | B2 * | 9/2006 | Shandross | A47J 37/1266 99/333 |
| 7,309,422 | B2 * | 12/2007 | Mullaney, Jr. | B01D 35/0273 210/DIG. 8 |
| 7,698,994 | B2 * | 4/2010 | Mullaney, Jr. | A47J 37/1223 99/330 |
| 8,186,265 | B2 * | 5/2012 | Popeil | A23L 5/11 99/413 |
| 8,707,857 | B2 * | 4/2014 | Popeil | A47J 37/1266 99/410 |
| 8,826,807 | B1 * | 9/2014 | Bourgeois | A47J 27/04 99/413 |
| 8,850,965 | B2 * | 10/2014 | Popeil | A47J 37/1219 426/523 |
| 8,910,565 | B2 * | 12/2014 | Reeser | A47J 37/1233 210/DIG. 8 |
| 9,055,839 | B1 * | 6/2015 | Bourgeois | A47J 37/1247 |
| 9,357,881 | B2 * | 6/2016 | Gardner | G01F 23/246 |
| 9,435,344 | B1 * | 9/2016 | Highnote | F04D 29/426 |
| 9,861,234 | B2 * | 1/2018 | Forrest | A47J 37/1285 |
| 2008/0282905 | A1 * | 11/2008 | Savage | B30B 9/047 426/438 |
| 2014/0004234 | A1 * | 1/2014 | Mosteller | A47J 37/1266 99/330 |
| 2017/0127883 | A1 * | 5/2017 | Casey | A47J 37/1266 |
| 2017/0150846 | A1 * | 6/2017 | Hur | H05B 6/108 |
| 2017/0258271 | A1 * | 9/2017 | Man | A47J 37/1223 |
| 2021/0330124 | A1 * | 10/2021 | Cyr | A47J 37/1223 |

* cited by examiner

SECTION A

HIGH SPEED CONVECTION FRYER

THE TECHNICAL FIELD OF INVENTION

The disclosure provides a convection fryer and its improvements to U.S. Pat. No. 4,623,544 falls within the commercial, industrial pot fryer systems. The fryer sells will be centered around schools, hospitals, industrial processing plants, and commercial restaurants. The convection flow of oil through the fry tank makes this unit highly efficient compared to conventional pot fryers. This fryer cooks food product faster, saving cooking oil, and saving energy with approximately eighty seven percent efficient heat exchanger.

SUMMARY OF THE INVENTION

According to the invention, cooking oil passes through a fry tank, to a pump, to a heat exchanger in a continuous recirculation loop. This produces a convection flow of cooking oil frying the food product. The convection fry has three unique features: 1. Location of the return screen from the front of fry tank to rear. 2. Heat exchanger return blocks with the front and rear face plates holding heat exchanger tubes in position. 3. Storage tank and filter bag for holding cooking oil for storage and also to allow cleaning of fry tank.

DETAILED DESCRIPTION

Figure 1:
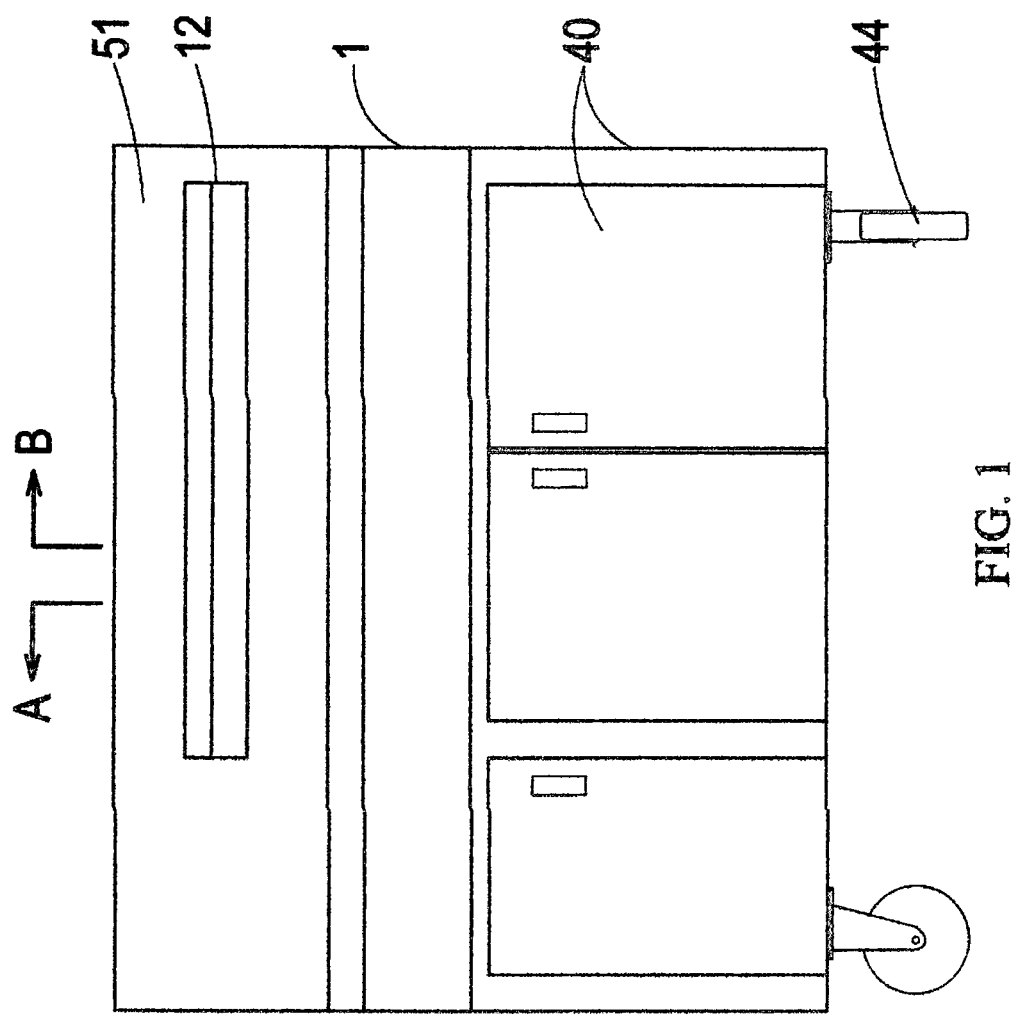
FIG. 1 is a view showing the facade of the fryer cabinetry.

FIG. 1 shows the cabinetry and facade 1. The access panels and doors 40 surrounding fry tank 7 are supported by frame 68. Casters 44 supports the frame comprising an internal space supports the entire fry system. Back splash 51 and basket holder 12 are integral parts of fry tank 7.

Figure 2:
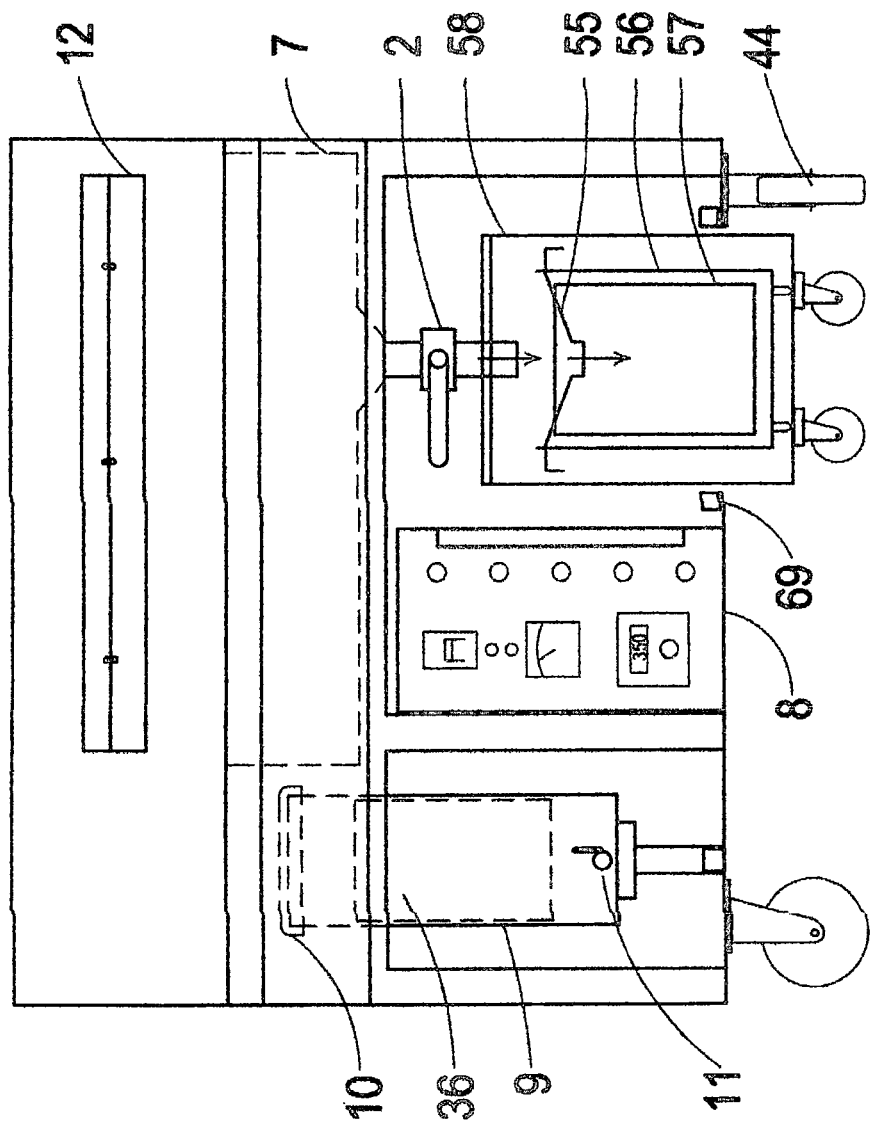
FIG. 2 is a front view of cabinetry with doors removed.

FIG. 2 shows the front cut away view of the fryer system, Drain valve 2 which allows oil to be drained from fry tank 7 to oil storage tank 58. The diffuser baffle 55 keeps oil from splashing into oil storage tank 58 and preventing aeration of stored cooking oil. Diffuser baffle 55 sits on a top filter frame 56 comprising an internal space supports filter medium 57 for catching food particles from fry tank when the oil drained at end of frying cycle by drain valve 2. Control panel 8 is located inside a front door of cabinetry 1 and beside the filter tank 9. The control Panel 8 comprises control switches, temperature thermostat, and electrical breakers used to operate fry system. A filtration system comprises filter tank 9 holds a filter medium 36 used to filter cooking oil continuously. The filtration system traps loose food particles to prevent carbonization of cooking oil. The filter tank 9 has a lid 10 used to open tank and remove filter. Drain valve 11 used to empty tank of cooking oil if necessary. Fry basket holder 12 is located on backsplash 51 to allow cooking oil to drain from food product and fry basket 70. Oil storage tank 58 allows cooking oil to be drained from fry tank 7 by valve 2 to storage tank consisting of diffuser baffle 55 with filter support frame 56 and filter bag 57.

Figure 3:
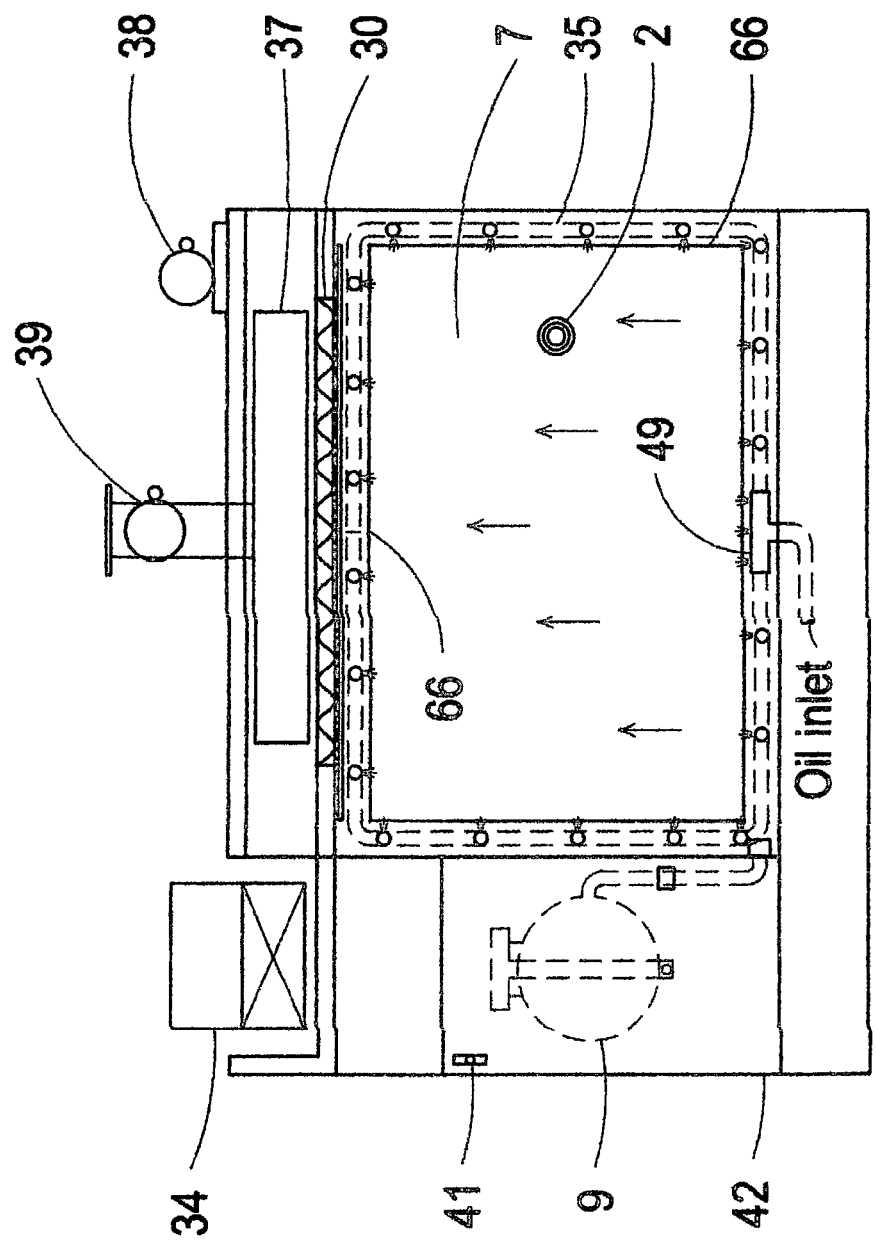
FIG. 3 is a top view of fryer tank and constant filter system.

FIG. 3 shows the fry tank 7 is the key to convection frying. Oil is pumped from the fry tank 7 via return trough 37 by the main circulating pump 39 to the heat exchanger 32 into the fry tank 7. The oil inlet tee 49 supplies oil from heat exchanger 32 to the disbursement tubes 35, which allows the cooking oil to flow through the fry tank 7 to the rear of the tank and filter screen 30. The return trough 37 completes the oil circulating loop to the main circulating pump 39. Baffling 66 insures oil is distributed evenly through the fry tank 7. Storage tank pump 38 used to pump oil from storage tank to the main fry tank 7. Exhaust stack 34 which funnels exhaust gases from heat exchange 32 to the kitchen hood exhaust fans. Continuous filtration tank 9 filters cooking oil from fry tank 7 by main circulating pump 39. The filter tank 9 is covered by cabinetry lid 42 which has a limit switch 41 located in top to prevent opening filter tank lid 10 in the cooking operation. Fry tank 7 also has drain valve 2 for draining the cooking oil from the fry tank into the oil storage tank 58.

Figure 4:
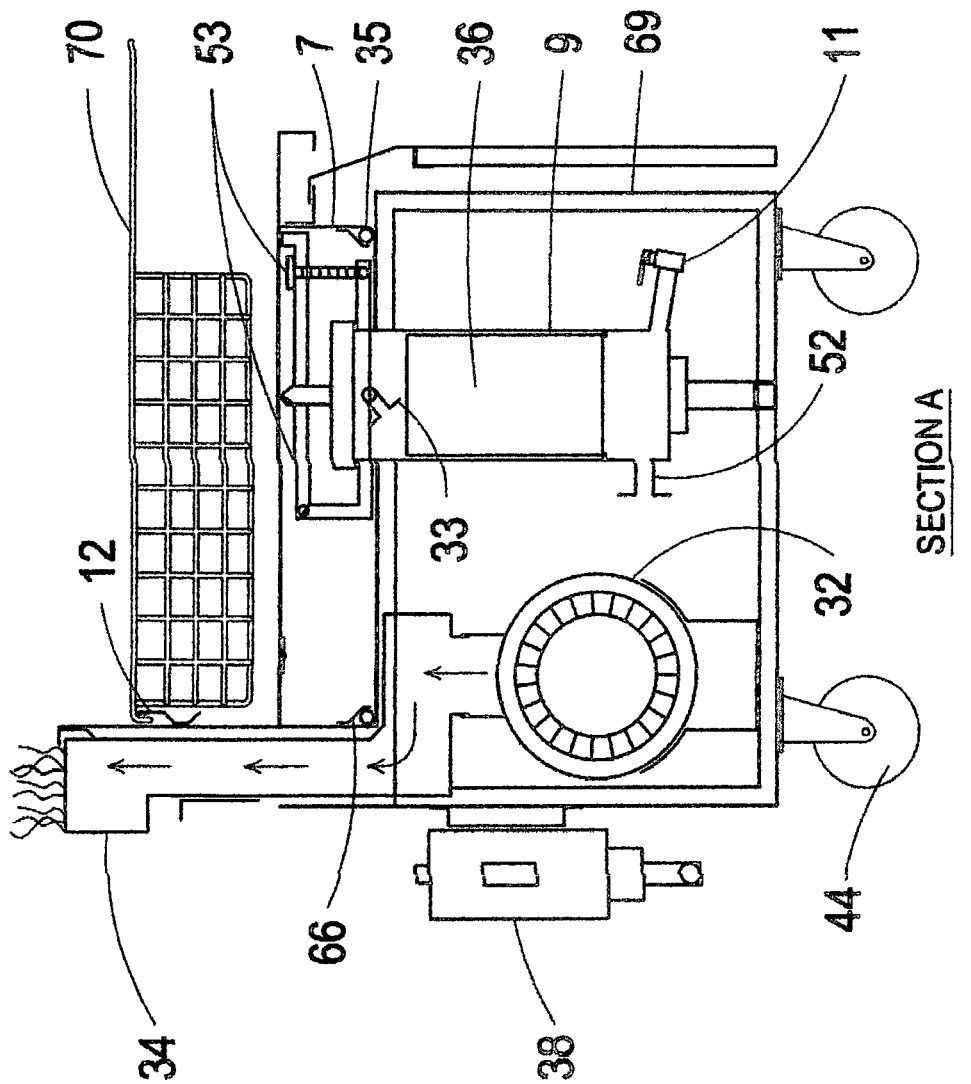
FIG. 4 is an end view of fry system detail competent parts along line A of FIG. 1.

FIG. 4 shows section A of FIG. 4 left end view, the location of the heat exchange 32 in relation to fry tank 7. The heat exchanger 32 provides the energy to bring the cooking oil to proper fry temperature. Filter tank 9 is located in front of heat exchanger 32. Filter tank 9 includes filter medium 36 and an inlet 33 to fill tank 9. The clean oil returns to fry system through filter tank exit 52, going to suction side of circulating pump 39. All connections from filter tank 9, heat exchanger 32, and main circulating pump 39 made with stainless steel flex hoses and sanitary joint connections. Filter tank 9 also has a drain valve 11 use to drain oil from tank when cleaning tank. Support frame 53 used to hold filter lid 10. The disbursement baffle 66 covering oil tubes 35. Fry basket 70 is supported by basket holder 12. Casters 44 supports frame 69 which in turn supports entire frying system. Pump 38 transfers oil from storage tank 58 to fry tank 7 for the frying process.

Figure 5:
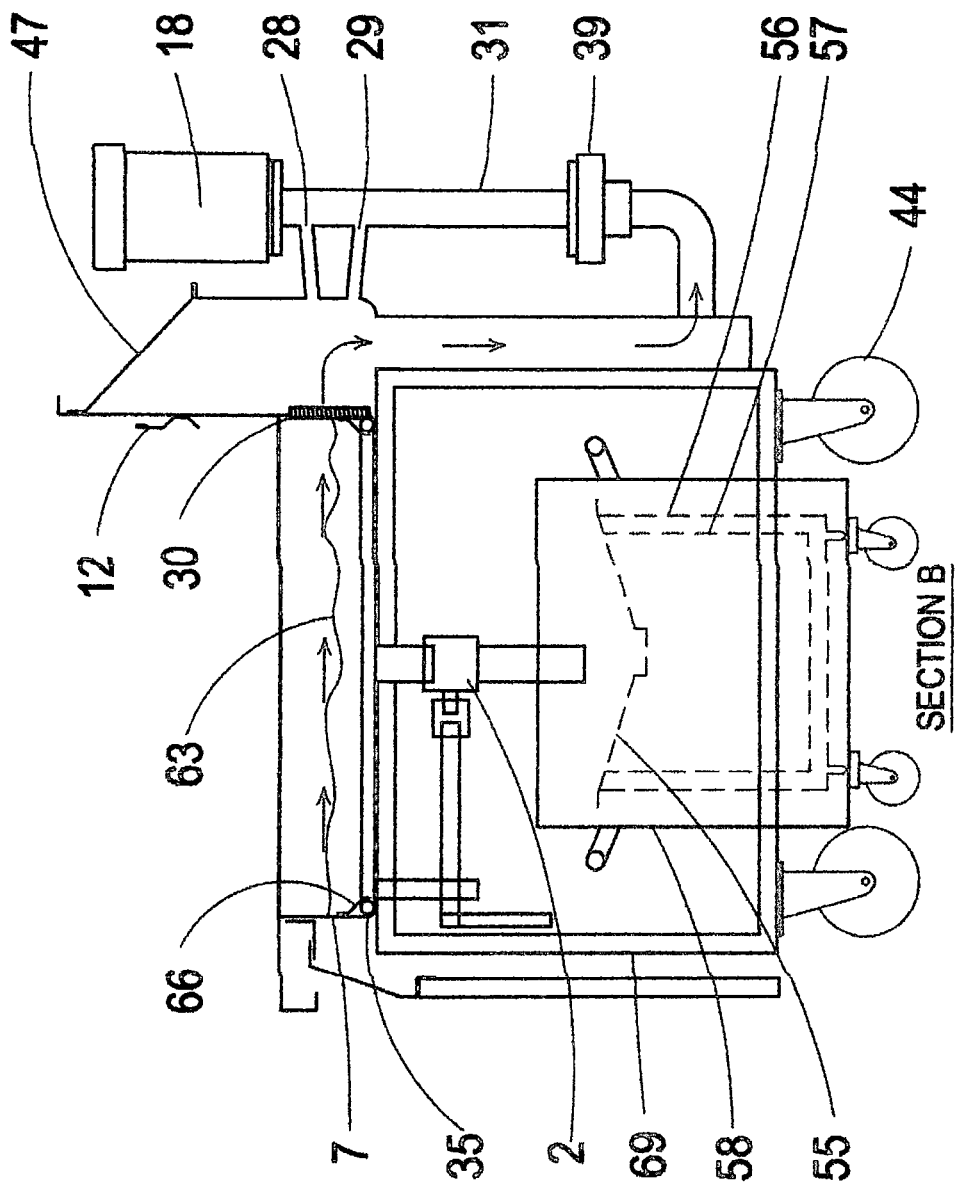
FIG. 5 is an end view of fry system detail competent parts along line B of FIG. 1.

FIG. 5 shows an end view section B right hand side facing the front of fry unit. The filter screen 30 located at the rear of fry tank 7 and allows cooking oil to flow through fry tank 7 to trough 37 and then to main circulating pump 39. Circulating pump 39 is supported by column 31, and powered by electric motor 18. Filter screen 30 traps food particles larger than ¼" and keeps them from clogging pump head 39. The heat exchanger 32 heats cooking oil 63 to proper temperature. Cooking oil 63 is pushed through the fry tank 7 through screen 30 to pump head 39 completing oil circulating loop. This provides a convection oil flow through fry tank 7 producing convection frying. Side view of oil storage tank 58 shows filter support frame 56 and filter bag 57. Oil diffuser baffle 55 sits on top of filter frame 56. Drain valve 2 from fry tank 7 to storage tank 58. Oil disbursement tube 35 and baffle Frame 66 depicted cover entire perimeter of fry tank 7. Backsplash support 47 used to strength basket holder 12.

Figure 6:
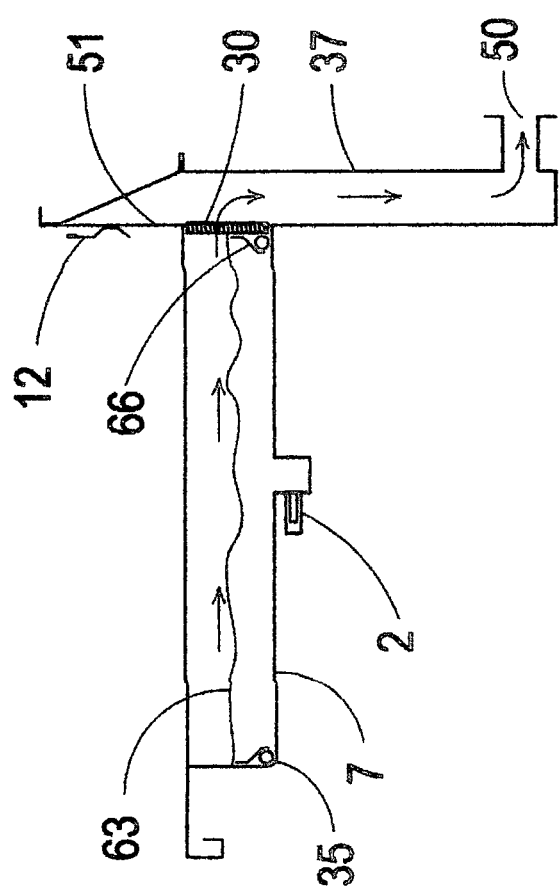
FIG. 6 is the flow through fry tank and return oil trough.

FIG. 6 shows a side view of fry tank 7 showing oil 63 flowing through tank 7 by oil tubes 35, and diffuser baffle 66 to trough 37 to main circulating pump connection 50. Backsplash 51, filter screen 30 and fry basket holder 12 also pictured. Fry tank 7 has drain valve 2 pictured for us in draining fry tank 7 into storage tank 58.

Figure 7:
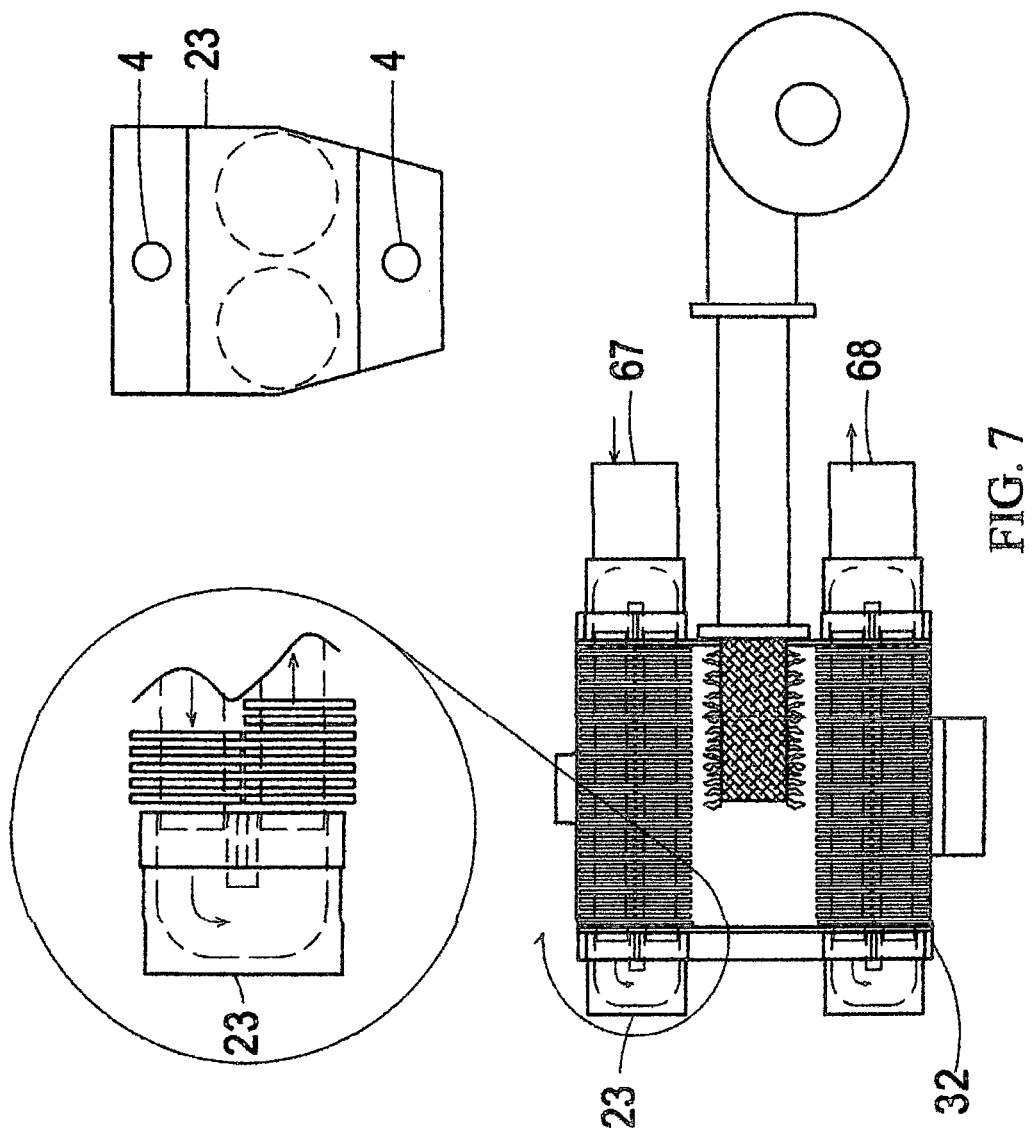
FIG. 7 shows details of end blocks for heat exchanger tubes and oil circulation.

FIG. 7 shows a sectional view of heat exchanger 32 showing end circulating blocks 23 and oil port inlet 67 and outlet 68. These ports allow cooking oil to enter heat exchanger tubes 17 for transferring of energy source to frying oil. Oil circulating blocks 23 are in a staggered position to oil tubes 17 to give even flow of cooking oil through heat exchanger 32.

Figure 8:
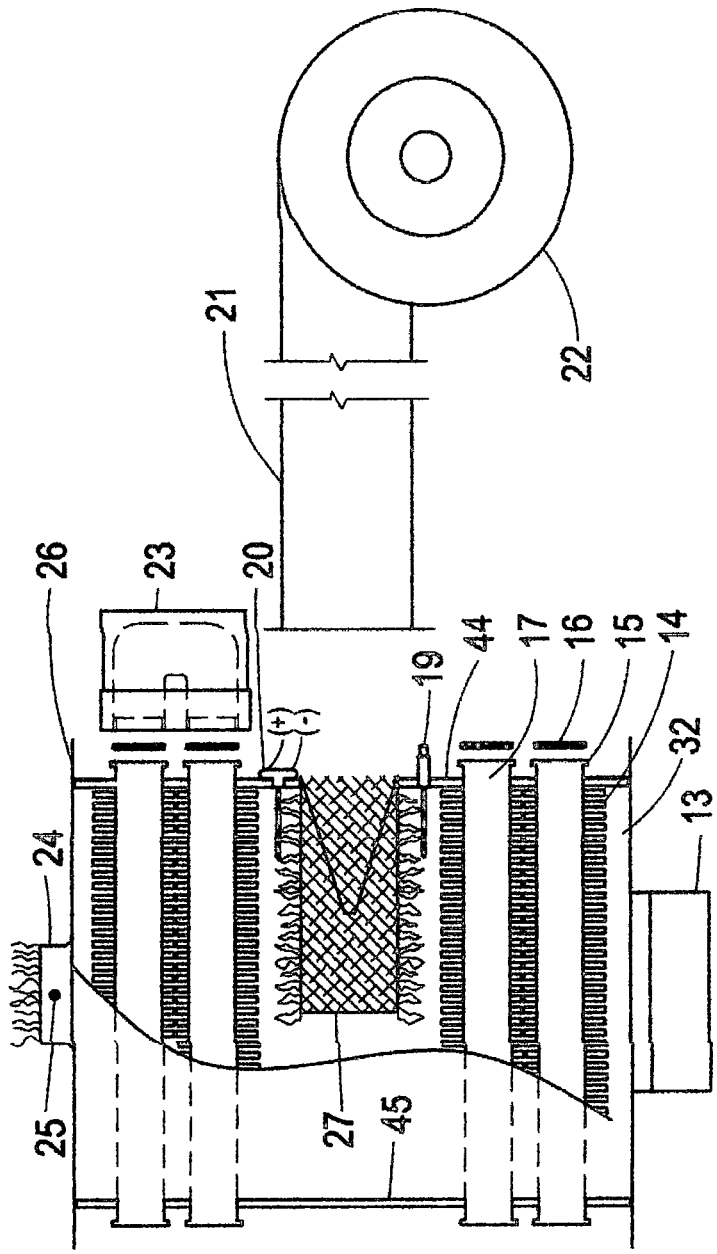
FIG. 8 is a cut away view heat exchanger providing oil energy transfer.

FIG. 8 shows a sectional view of interior of heat exchanger 32 showing component parts. Stand 13 supporting cowling 26 surrounding heat exchanger tubes 17. The heat module consists of power fan 22, extension tube 21, burner assembly 27, glow plug 20 for ignition, and flame sensing probe 19. Oil tubes 15 and fins 14 surround burner assembly 27. Cooking oil absorbs energy from heat exchanger tubes 17. The hot cooking oil flows over food product through fry tank 7, pulling the cold from the food product producing finished fried food. The exhaust stack 24 houses a high limit switch 25 to monitor temperature of exhaust gas to prevent over heating of cooking oil. End blocks 23 allow cooking oil to be circulate through heat exchanger tubes 17. End blocks 23 are mounted to oil tubes 17 by ferrules attached to oil tubes 15 with the end blocks 23 being held in position by gasket material 16 mated to tube ferrules and bolted in position with ¼" bolts 69 to face plates 44 and 45. Plate 44 holds burner assembly 27 in position along with heat exchanger tubes 17. End plate 45 holds oil tubes 17 in position from the rear of heat exchanger 32.

Figure 9:
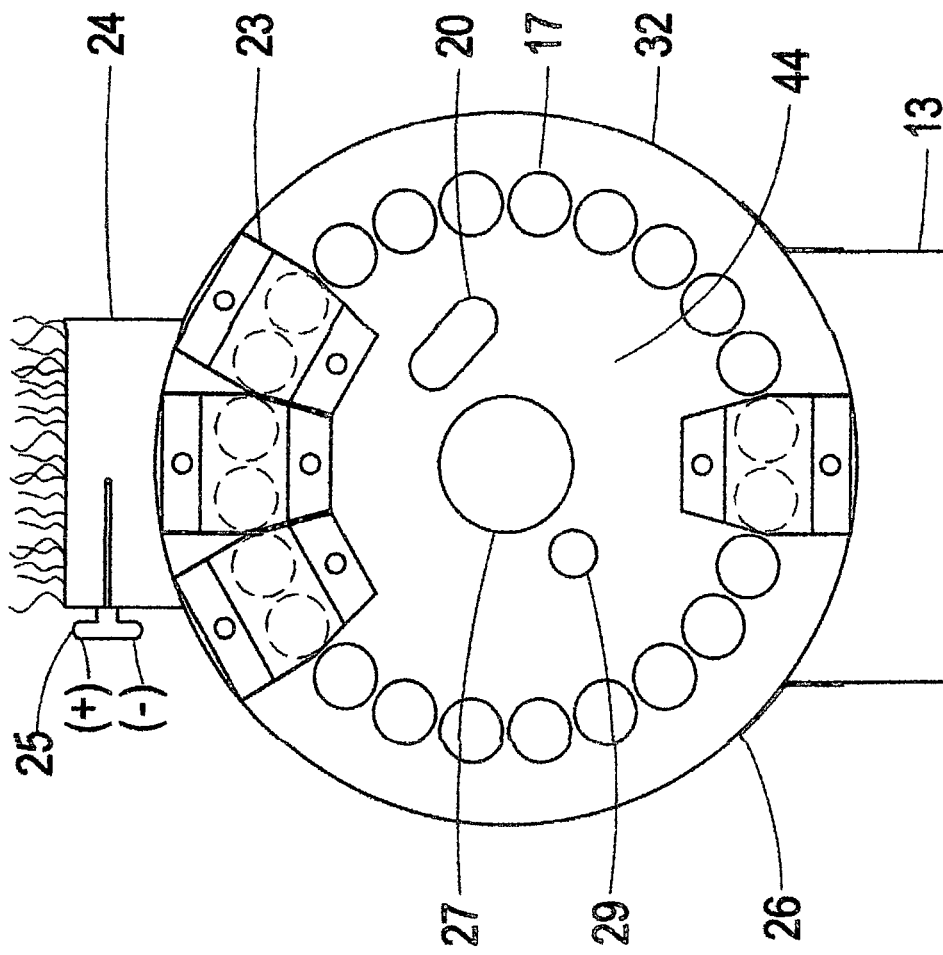
FIG. 9 shows end view of heat exchanger face plate and components.

FIG. 9 shows an end view of face plate 44 showing burner opening 27, heat exchanger tubes 17, module tube oil return blocks 23. Stand 13 supporting cowling 26. Support cowling 26 has an exhaust stack 24 with high limit switch 25 to prevent over heating of heat exchanger tubes 17. Element 20 is the flame ignitor and Element 29 is the flame sensing probe for proof of flame.

Figure 10:
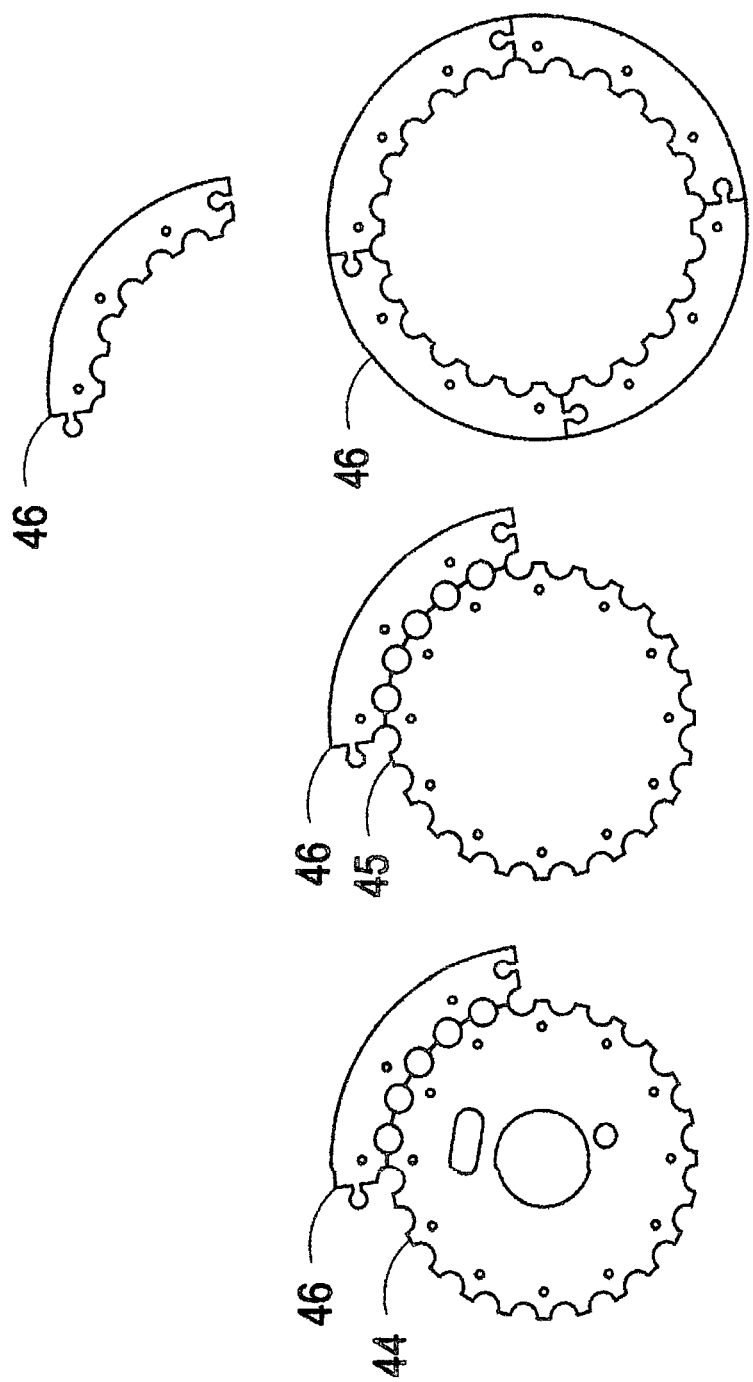
FIG. 10 is a face plate and end plate with positioning rings used to hold heat exchanger fined tubes in position.

FIG. 10 shows detail sketch end view of heat exchanger tube support plates 44 and 45. Position of locking rings 46 are shown in relation to face plates 44 and 45. These rings hold Heat exchanger oil tubes 17 in position for heat exchanger 32.

Figure 11:
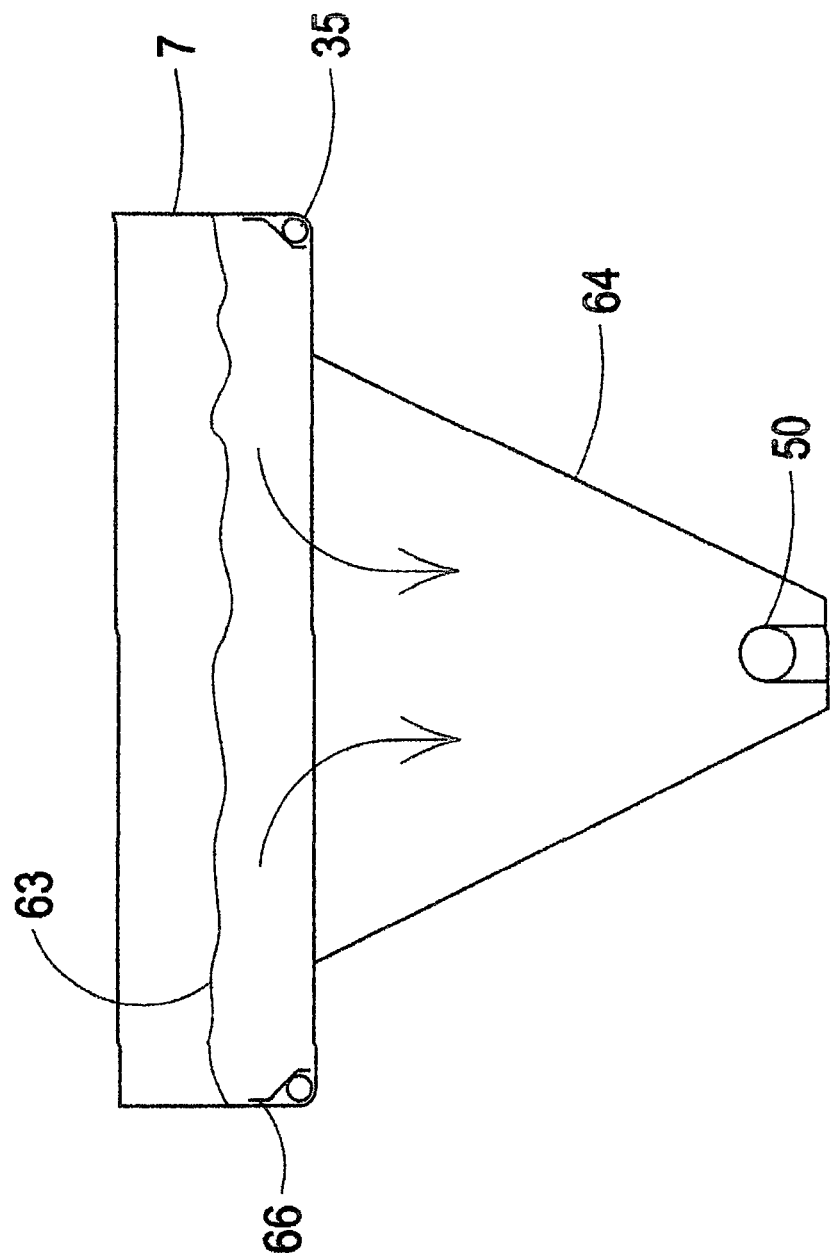
FIG. 11 is a back view of fry tank with accumulator trough supplying main circulating pump outlet.

FIG. 11 shows rear view of fry tank 7 showing oil level 63 to be approximately five inch deep in fry tank 7. Oil return trough 64 attached to rear bottom of fry tank 7. Return outlet 50 attaches to main circulating pump 39 for cooking oil circulation cycle. Oil disbursement tube 35 and baffle 66 insure even flow of cooking oil through fry tank 7.

Figure 12:
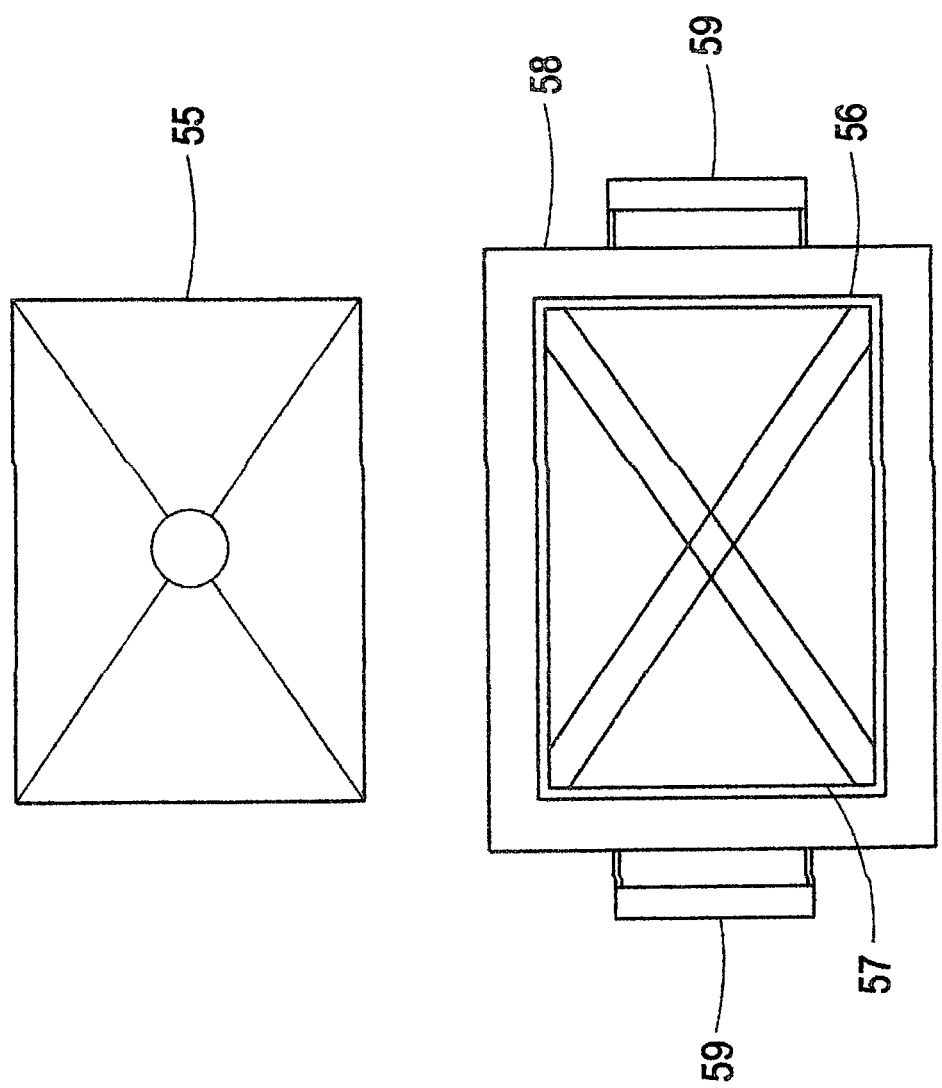
FIG. 12 is a top view of oil storage tank with filter support frame and filter bag.

FIG. 12 shows the top view of cooking oil storage tank 58. Inside the Tank 58 is a stainless steel oil disbursement baffle 55. Filter frame 56 holding a mesh filter bag 57. Tank handles 59 for removing storage tank for cleaning.

Figure 13:
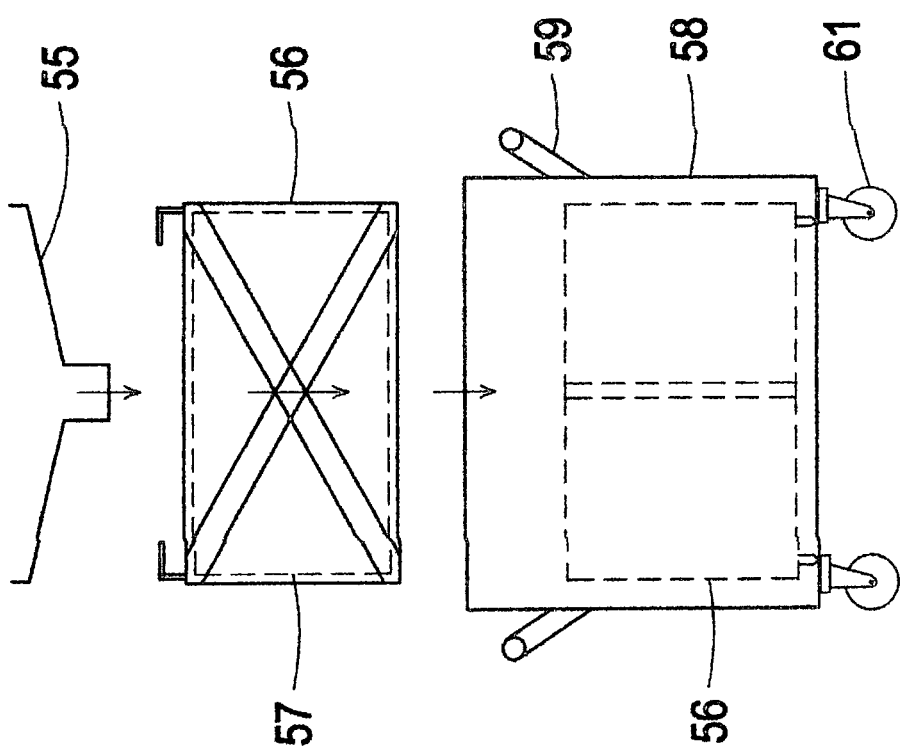
FIG. 13 is a side view of oil storage tank with diffuser plate, filter bag and frame.

FIG. 13 shows a side view of storage tank 58. The storage tank is located under fry tank 7 and allows cooking oil to be drained from the fry tank 7 to the storage tank 58 by drain valve 2 located under fry tank 7. Storage tank is designed to hold cooking oil drained from fry tank 7 to allow cleaning of food particles from fry tank 7. Food particles are sweep into the storage tank 58 through drain valve 2 located in fry tank 7. Filter frame 56 sets inside storage tank 58. Filter bag 57 is held in position by filter frame 56. A diffuser baffle 55 sets on top of filter frame 56 to keep oil from splashing into storage tank 58 as it is being drained from fry tank 7, preventing oil from splashing into storage tank 58 reducing chance stored oil will be aerated. The storage tank 58 is removal and can be moved from under fry tank 7 for cleaning by tank handles 59 and 2" swivel casters 69.

Figure 14:
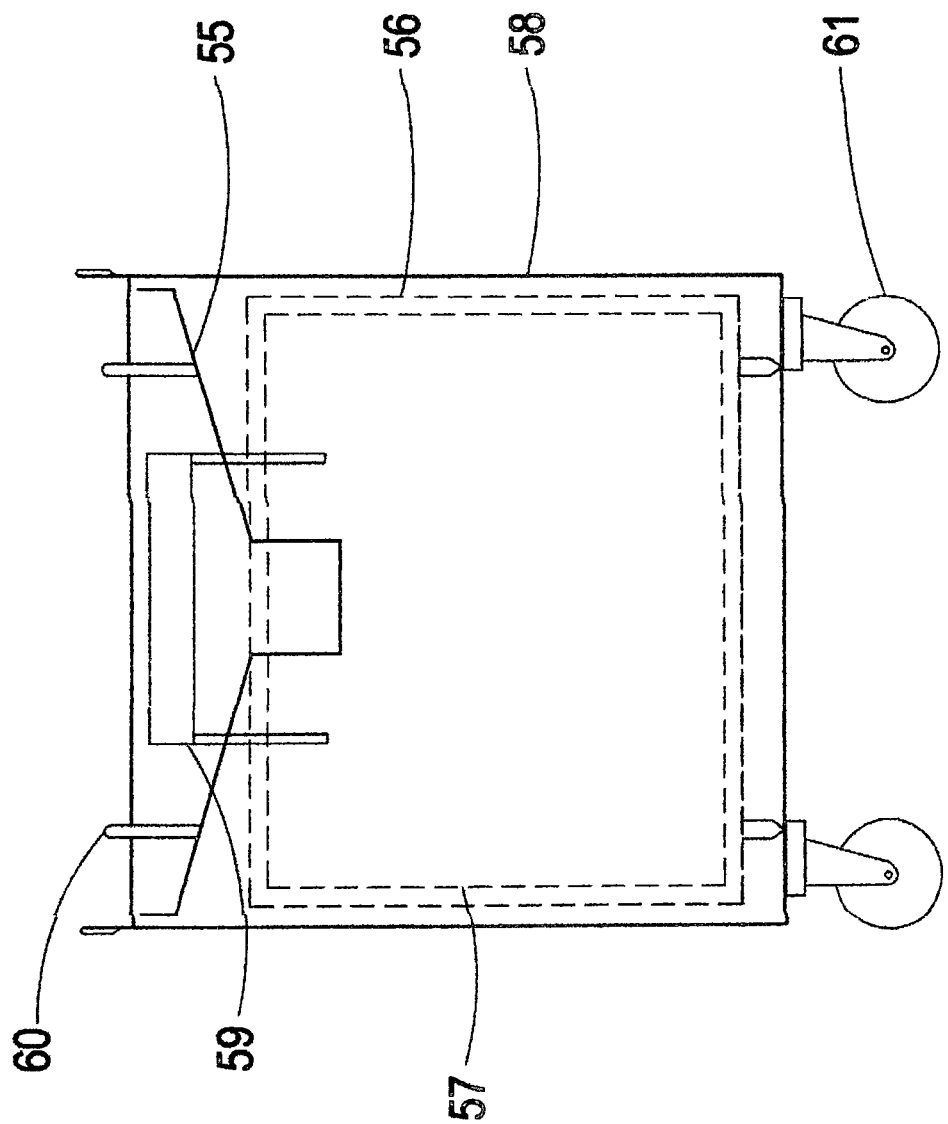
FIG. 14 is an end view showing oil storage component parts.

FIG. 14 shows the end view of cooking oil storage tank 58. Four casters 61 support storage tank 58. Filter frame 56 supports filter bag 57 comprising a composite high temperature mesh screen. This filter bag catches food crumbs from fry tank 7 when tank is drained for cleaning. Stainless steel baffle 55 sits on the top of 56 frame. Handles 60 help remove baffle 55 for cleaning. Tank handles 59 help remove storage tank 58 from under fry tank 7 for cleaning. The storage tank 58 main purpose is to hold cooking oil drained from fry tank 7 to facilitate the cleaning of fry tank 7 easily. After fry tank 7 is cleaned, oil is pumped from storage tank 58 back to fry tank 7 by pump 38.

Figure 15:
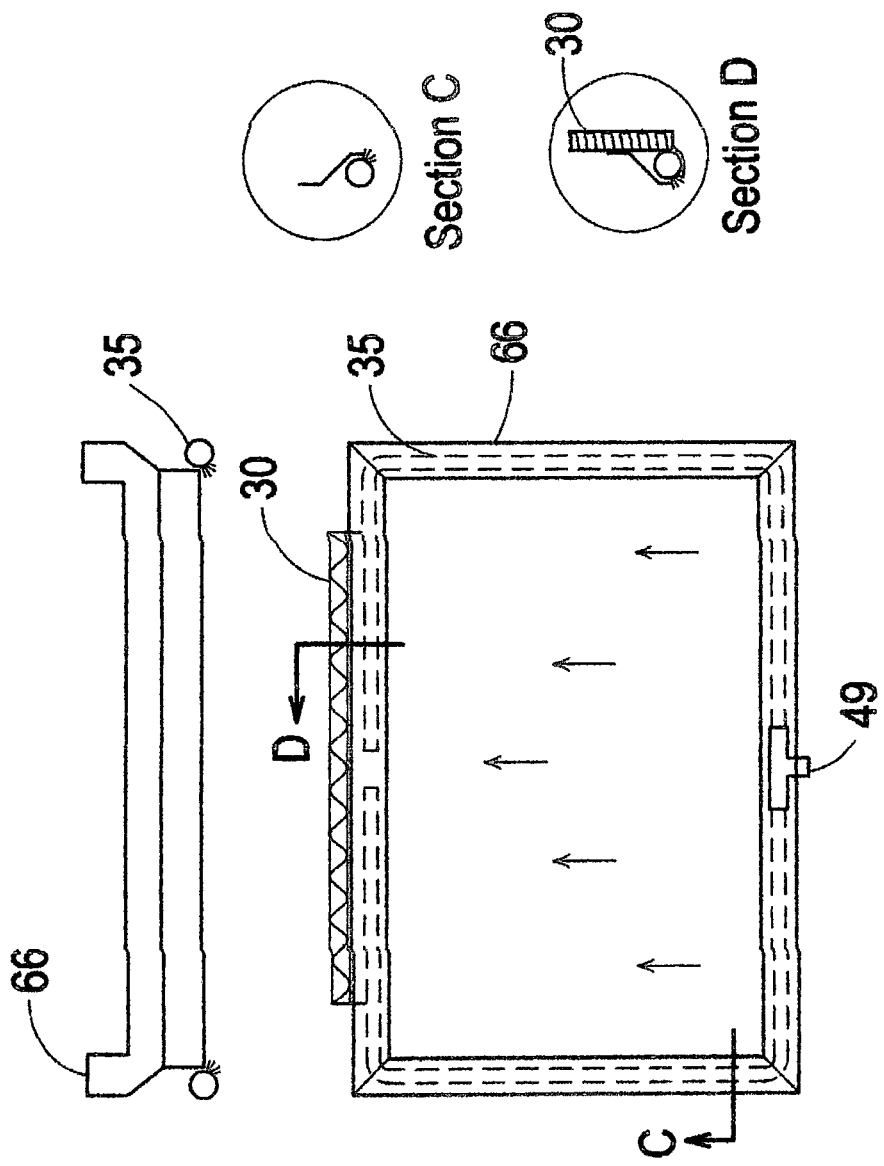
FIG. 15 is a top view of oil supply tubes and disbursement baffle location inside the fry tank, showing the parts in distributing cooking oil evenly through the frying compartment.

FIG. 15 shows the detail of baffle flange 66 and relation to disbursement pipe 35. Disbursement pipe 35 infuses the fry tank 7 with continuous hot cooking oil. The diffuser baffle 66 insures cooking oil is spread evenly in fry tank 7. Cooking oil is introduced through the oil inlet tee 49 to disbursement tubes 35, the oil moves through the fry tank 7 to the rear filter screen sweeping the cold from food product cooking it to desired temperature and returning cooking oil to pump 39 for recycle to heat exchanger 32 and back into fry tank 7.

The invention claimed is:

1. A convection fryer comprising:
   a housing;
   a fry tank is detachable mounted within said housing and integrated with a back splash and a basket holder, wherein the fry tank having a top opening that configured to contain a fry basket;
   an oil storage tank located in the housing and below the fry tank, wherein the oil storage tank is consisting of a mesh filter bag configured for catching food particles in the cooking oil, a filter frame holding the mesh filter bag, and a diffuser baffle sitting on a top of the filter frame;
   a drain valve connected to a bottom of the fry tank and the oil storage tank, and configured to drain a cooking oil in the fry tank to the oil storage tank;
   a storage tank pump mounted on an exterior of a rear side of the housing, and configured to pump the cooking oil form the storage tank to the fry tank;
   a heat exchanger located in the housing and configured to heat the cooking oil to a fry temperature, wherein the heat exchanger comprises a heater, an oil inlet of the heat exchanger, an oil outlet of the heat exchanger, and a plurality of circulating blocks;
   a circulating pump mounted on the exterior of the rear side of the housing and connected to the fry tank via a return trough, wherein the circulating pump is configured to pump the cooking oil from the fry tank to the circulating pump via the return trough, and pump the cooking oil from the circulating pump back to an oil inlet of the fry tank via the heat exchanger to complete the cooking oil circulation path;
   a filter screen is located at a rear side of the fry tank and connect to the return trough, wherein the filter screen is configured to filter particles larger than ¼"; and a filter tank comprising a filter medium for filtering the cooking oil, and the filtered oil returns to the fry tank through an exit of filter tank by the circulating pump;

wherein the heater consists of a power fan, extension tube, a burner, a glow plug, and a flame sensing probe;

wherein each of the plurality of circulating block comprises a U-turn channel with fine-tuned smooth bore configured for whirling the cooking oil flow within the heat exchanger, and each of the plurality of circulating blocks coupled to two oil tubes surrounding the heater.

* * * * *